(12) United States Patent
Bohnstingl et al.

(10) Patent No.: US 11,604,976 B2
(45) Date of Patent: Mar. 14, 2023

(54) CROSSBAR ARRAYS FOR COMPUTATIONS IN MEMORY-AUGMENTED NEURAL NETWORKS

(71) Applicant: International Business Machines Corporation, Armonk, NY (US)

(72) Inventors: Thomas Bohnstingl, Thalwil (CH); Angeliki Pantazi, Thalwil (CH); Stanislaw Andrzej Wozniak, Kilchberg (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 16/862,441

(22) Filed: Apr. 29, 2020

(65) Prior Publication Data
US 2021/0342672 A1    Nov. 4, 2021

(51) Int. Cl.
*G06N 3/063* (2006.01)
*G06N 3/04* (2023.01)

(52) U.S. Cl.
CPC .............. *G06N 3/063* (2013.01); *G06N 3/04* (2013.01)

(58) Field of Classification Search
CPC .... G06N 3/0635; G06N 3/063; G06N 3/0445; G06N 3/04; G06N 3/03
See application file for complete search history.

(56) References Cited

U.S. PATENT DOCUMENTS

| | | | |
|---|---|---|---|
| 2015/0170025 A1* | 6/2015 | Wu | G06N 3/0635 706/25 |
| 2017/0169332 A1 | 6/2017 | Graves et al. | |
| 2018/0075339 A1 | 3/2018 | Ma | |
| 2018/0341495 A1* | 11/2018 | Culurciello | G06N 3/08 |
| 2019/0026430 A1* | 1/2019 | Grouchy | G06N 20/00 |
| 2019/0057301 A1 | 2/2019 | Pantazi et al. | |

(Continued)

FOREIGN PATENT DOCUMENTS

CN         107590533 A        1/2018

OTHER PUBLICATIONS

Burr et al., "Phase change memory technology", Journal of Vacuum Science & Technology B, vol. 28, Issue 2, Mar. 2010, 41 pages, <https://doi.org/10.1116/1.3301579>.

(Continued)

*Primary Examiner* — Caridad Everhart
(74) *Attorney, Agent, or Firm* — Edward J. Wixted, III

(57) ABSTRACT

In a hardware-implemented approach for operating a neural network system, a neural network system is provided comprising a controller, a memory, and an interface connecting the controller to the memory, where the controller comprises a processing unit configured to execute a neural network and the memory comprises a neuromorphic memory device with a crossbar array structure that includes input lines and output lines interconnected at junctions via electronic devices. The electronic devices of the neuromorphic memory device are programmed to incrementally change states by coupling write signals into the input lines based on: write instructions (Continued)

received from the controller and write vectors generated by the interface. Data is retrieved from the neuromorphic memory device, according to a multiply-accumulate operation, by coupling read signals into one or more of the input lines of the neuromorphic memory device based on: read instructions from the controller and read vectors generated by the interface.

18 Claims, 6 Drawing Sheets

(56) References Cited

U.S. PATENT DOCUMENTS

| | | | |
|---|---|---|---|
| 2019/0065943 | A1 | 2/2019 | Cantin et al. |
| 2021/0182077 | A1* | 6/2021 | Chen .................. G06F 7/5443 |
| 2021/0232900 | A1* | 7/2021 | Lee ..................... G06N 3/084 |
| 2022/0036195 | A1* | 2/2022 | Corlay ................ G06K 9/6256 |

OTHER PUBLICATIONS

Csordas et al., "Improving Differentiable Neural Computers Through Memory Masking, De-Allocation, and Link Distribution Sharpness Control", Proceedings of the Seventh International Conference on Learning Representations ICLR, May 6-9, 2019, New Orleans, LA, 13 pages.

Graves et al., "Hybrid Computing Using a Neural Network with Dynamic External Memory" Nature Journal, vol. 538, 2016, pp. 471-476 <https://www.gwern.net/docs/rl/2016-graves.pdf>.

Graves et al., "Neural Turning Machines", arXiv:1410.5401v2, Dec. 10, 2014, 26 pages, <https://arxiv.org/pdf/1410.5401.pdf>.

Muthirayan et al., "Memory Augmented Neural Network Adaptive Controllers: Performance and Stability", arXiv:1905.02832, 2019, May 2019, 17 pages, <https://arxiv.org/pdf/1905.02832.pdf>.

Pantazi et al., "All-memristive neuromorphic computing with level-tuned neurons", Nanotechnology, vol. 27, Jul. 2016, 14 pages.

Park et al., "Energy-Efficient Inference Accelerator for Memory-Augmented Neural Networks on an FPGA", Design, Automation & Test in Europe Conference & Exhibition (DATE), Mar. 25-29, 2019, Florence, Italy, 4 pages, <https://arxiv.org/pdf/1805.07978.pdf>.

Ranjan et al., "X-Mann: A Crossbar based Architecture for Memory Augmented Neural Networks", Proceedings of the Design Automation Conference (DAC), Jun. 2-Jun. 6, 2019, Las Vegas, NV, 6 pages.

Santoro et al., "One-shot Learning with Memory-Augmented Neural Networks", arXiv:1605.06065, May 2016, 13 pages.

Tang et al., "Identifying long-term stable refugia for relict plant species in East Asia", Proceedings of the 2018 IEEE International Electron Devices Meeting, Dec. 1-5, 2018, San Francisco, CA, 25 pages, <https://www.researchgate.net/publication/328555796_Tang_et_al_2018_Nature_Communications_Supplementary_Information>.

Wozniak et al., "Learning Spatio-Temporal Patterns in the Presence of Input Noise using Phase-Change Memristors", Proceedings of the IEEE International Symposium on Circuits and Systems (ISCAS), May 22-25, 2016, Montreal, QC, 2016, pp. 365-368.

* cited by examiner

CROSSBAR ARRAYS FOR COMPUTATIONS IN MEMORY-AUGMENTED NEURAL NETWORKS

BACKGROUND

The present invention relates generally to the field of neural network systems, and more particularly to memory-augmented neural network systems which use neuromorphic memory devices, with a crossbar array structure, as external memories.

Machine learning often relies on artificial neural networks (ANNs), which are computational models inspired by biological neural networks in human or animal brains. Such systems progressively and autonomously learn tasks by means of examples and have successfully been applied to, e.g., speech recognition, text processing, and computer vision.

Neural networks include feedforward neural networks, such as multilayer perceptrons, deep neural networks, and convolutional neural networks. Neural networks are typically implemented in software. However, a neural network may also be implemented in hardware, e.g., as a resistive processing unit (a crossbar array structure) or an optical neuromorphic system.

Various types of hardware systems may be used to execute neural networks. Of particular advantage is to use a memory-augmented neural network system. The basic idea of memory-augmented neural networks is to enhance a neural network with an external memory. Memory-augmented neural networks (MANNs) benefit from a powerful architecture combining advantages from neural network data processing and persistent storage.

SUMMARY

Aspects of an embodiment of the present invention disclose a hardware-implemented method and a neural network system. A neural network system is provided comprising a controller, a memory, and an interface connecting the controller to the memory, where the controller comprises a processing unit configured to execute a neural network and the memory comprises a neuromorphic memory device with a crossbar array structure that includes input lines and output lines interconnected at junctions via electronic devices. Electronic devices of the neuromorphic memory device are programmed to incrementally change states thereof by coupling write signals into one or more of the input lines based on: (i) write instructions received from the controller and (ii) write vectors generated by the interface, according to the write instructions. Data is retrieved from the neuromorphic memory device, according to a multiply-accumulate operation, by coupling read signals into one or more of the input lines of the neuromorphic memory device based on: (i) read instructions from the controller and (ii) read vectors generated by the interface, according to the read instructions.

DETAILED DESCRIPTION

Figure 1:
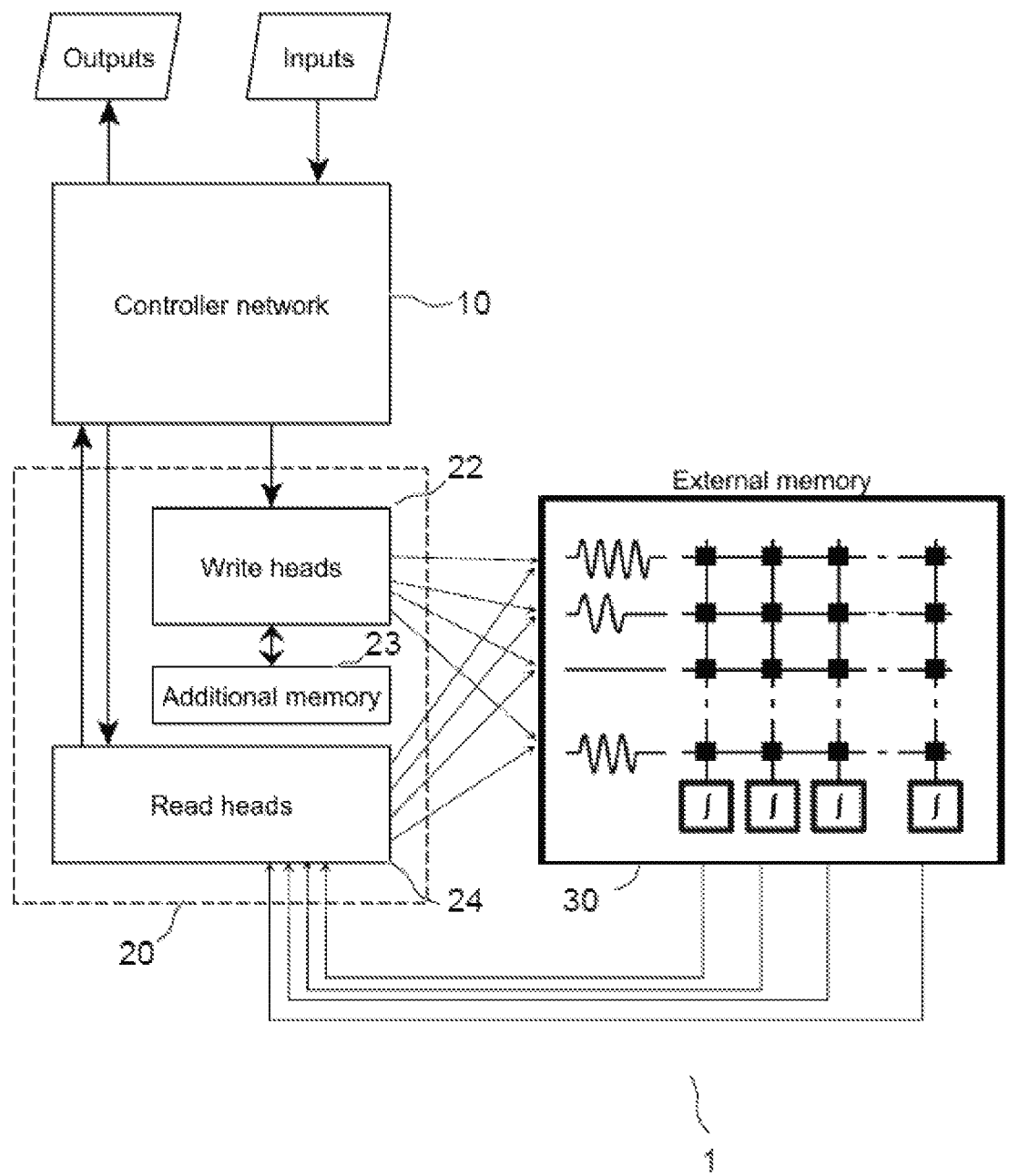
FIG. 1 is a block diagram schematically illustrating selected components of a neural network system, in accordance with an embodiment of the present invention.

Embodiments of the present invention recognize that in regular neural network systems, information can only be stored in the internal states (e.g., if the network is composed of long short-term memory (LSTM) units, information has to be stored in the states of the unit). Embodiments of the present invention recognize that this has the disadvantage that, if a new input arrives at the unit, the stored information is potentially overwritten and can only be preserved for a finite amount of time. Embodiments of the present invention further recognize that if the same network is extended with an external memory, as in memory-augmented neural network systems, the network can take advantage of this storage and use it to retain information over a long time.

Memory-augmented neural networks have several advantages. Embodiments of the present invention use a neuromorphic device (e.g., a crossbar array structure) as an external memory for a neural network system.

In order to extend a neural network with an external memory, there has to be an interface. This interface may, for instance, comprise read and write heads (there can be several read heads and several write heads). The purpose of these heads is to retrieve data from the external memory and to write information to the external memory.

The controller (also called controller network) refers to the unit that includes the processing unit executing the neural network. This controller can be regarded as a unit executing a regular neural network, which receives some input and produces some output. Without an external memory, this is equivalent to a standard neural network as used to solve any particular task. In embodiments, the controller is coupled to a feature extraction unit (not shown), which is used to extract features from input data (e.g., images), whereby extracted features are provided to the controller for it to execute the neural network based on such extracted features (be it for training or inference purposes). Any suitable feature extraction scheme can be contemplated, e.g., relying on principal component analysis or a convolutional neural network. Other pre-processing entities may be involved, if needed. Now, such pre-processing entities may possibly be integrated in the controller. Thus, various architectures may be contemplated for the controller network (e.g., the controller may essentially aim at executing a simple feedforward neural network or a complex recurrent neural network with multiple layers). For the sake of simplicity, one may for example consider this network to be a single layer of recurrent LSTM units.

In general, the structures of the read and write heads depend on the chosen type of memory-augmented neural network system. Many variants are available. The read and write heads may for instance be represented by a shallow neural network. The read heads receive an input from the controller. The structure of this input also depends on the type of memory-augmented neural network. In simple scenarios, the input to the read heads is just the same as the input to the controller network itself. Based on this input, the read heads produce read vectors $w^r$, which are used to access the external memory $M[i,j]$:

$$r = \Sigma_{i=1}^{N} M[i,j]^T w^r[i]$$

In a very simple case, the input to the read heads passes through the shallow neural network and the result of this operation forms the read vector $w^r$. More complex read head architectures exist, involving, for example, attention mechanisms. In essence, the read vectors are used to access the external memory, irrespective of how the read vectors are generated. The result r (from accessing the memory) is returned to the controller network, which can then use the result r to produce the output to an initially given input.

The write heads operate in a similar way as the read heads. The write heads receive an input from the controller network, which, in a simple case, is just the input to the controller network itself. Contrary to the read heads, however, the task of the write heads is to store information in the external memory, rather than read information. In essence, write heads achieve this by generating write vectors $w^w$ and v, which are used to write to the memory. Again, the exact procedure of how to generate such vectors is specific to the type of memory-augmented neural network. In a simple case, the input to the write heads passes through two shallow neural networks and the results are $w^w$ and v. The memory content is then modified according to:

$$M[i,j] = M[i,j](1 - w^w[i]e^T[j]) + w^w[i]v^T[j]$$

Embodiments of the present invention rely on an external memory that has a crossbar array structure and uses electronic devices such as memristive devices, e.g., phase-change memory (PCM) cells. This type of memory device cannot easily be used like conventional memory (e.g., a SRAM or DRAM). It can be understood that memristive cells favor a specific way of writing to the memory, i.e., one can incrementally add values to the cells and one can reset the cells to zero if one needs to subtract a value. In order to account for this constraint, embodiments of the present invention propose a modification to the write heads. Embodiments of the present invention program the electronic devices (the cells) of the external memory device to incrementally change states thereof, by coupling write signals into input lines of the external memory, based on write instructions from the controller and write vectors generated by the interface, according to such write instructions. In particular embodiments, the write heads may either maintain the previous states of the cells or fully reset the states of the cells to zero. Note, this modification is indifferent as to the procedure of how to obtain the write vectors and may, therefore, be applied to different types of memory-augmented neural networks. Embodiments of the present invention are discussed in further detail with respect to the Figures.

Figure 2A:
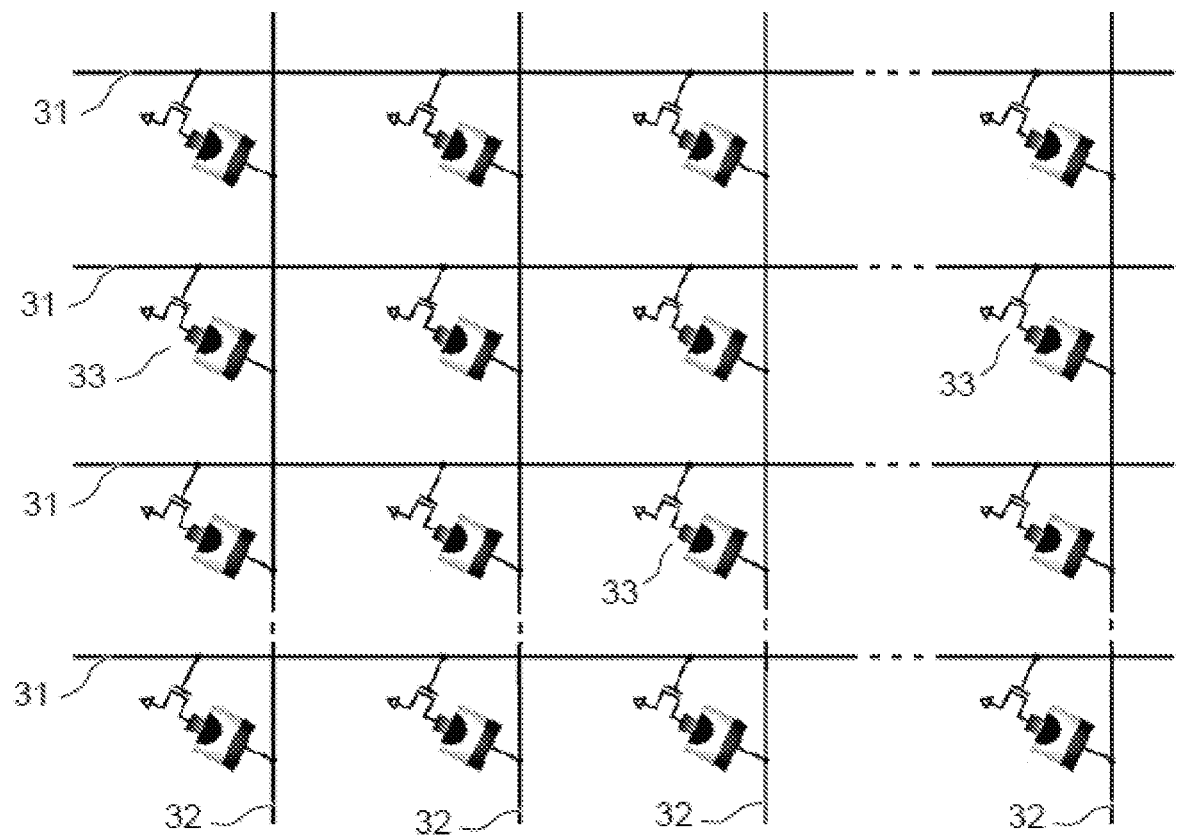
FIG. 2A schematically represents a memristive crossbar array of a neuromorphic memory device of the system of FIG. 1, in accordance with an embodiment of the present invention.
Figure 2B:
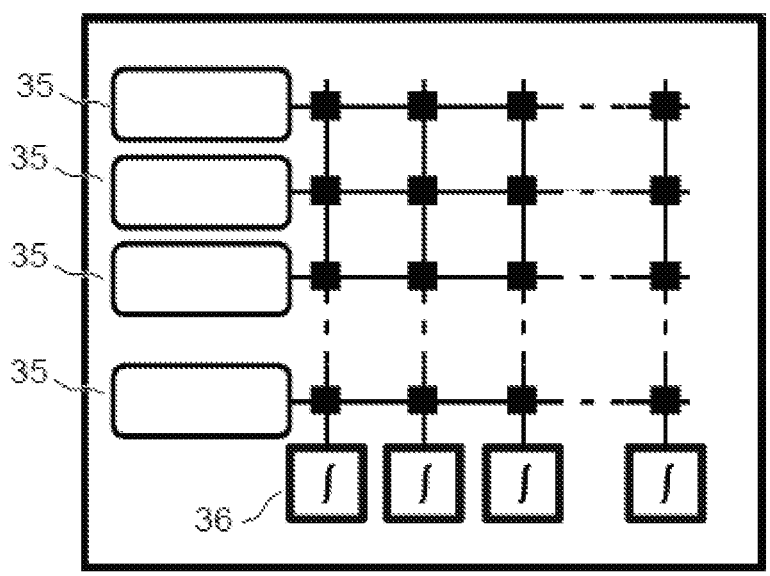
FIG. 2B schematically illustrates a neuromorphic memory device of the neural network system of FIG. 1, wherein the memory device comprises pulse width modulation circuits and readout circuits, in accordance with an embodiment of the present invention.
Figure 3:
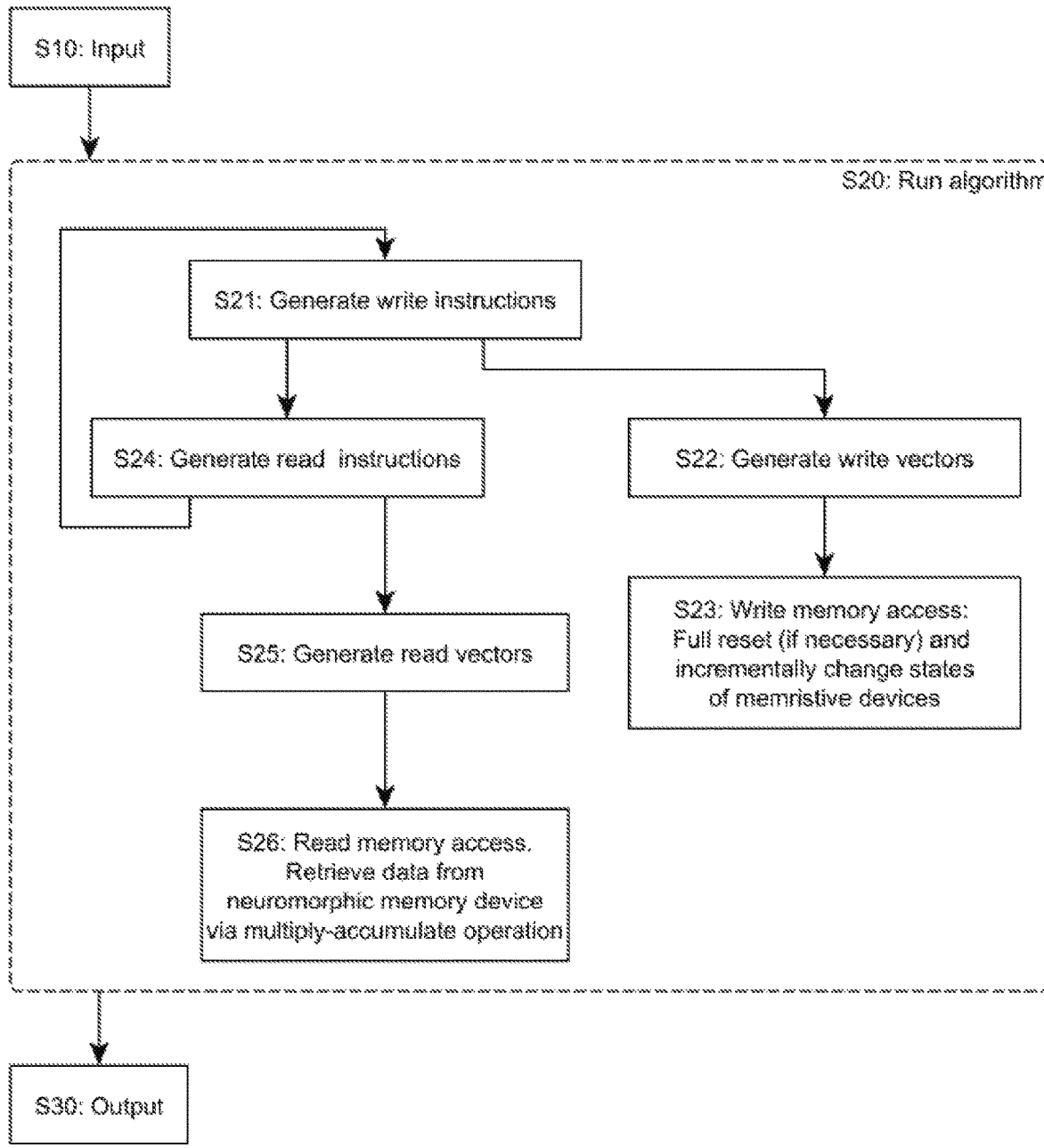
FIG. 3 is a flowchart illustrating high-level steps of a method of operating the neural network system of FIG. 1, in accordance with an embodiment of the present invention.

In reference to FIGS. 1-3, an aspect of an embodiment of the invention is first described, which concerns a hardware-implemented method of operating a neural network system 1 based on received input (S10) and generating output (S30). This method, and its variants, are collectively referred to as the "present methods". All references to "Sij(k)" refer to methods steps depicted in the flowcharts of FIGS. 3-5. Such methods rely on a neural network system 1, which further concerns another aspect of embodiments of the present invention. Essentially, the system 1 comprises a controller 10, a memory 30, and an interface 20. This interface 20 connects the controller 10 to the memory 30. The controller 10 comprises a processing unit which is configured to execute a neural network; the controller can thus be regarded as a controller network. The memory 30 comprises a neuromorphic memory device which has a crossbar array structure. This structure includes input lines 31 and output lines 32, where the lines 31, 32 are interconnected at junctions via electronic devices 33 (e.g., memristive devices).

The electronic devices 33 of the neuromorphic memory device 30 are programmed S21-S23 so as to incrementally change (S23) states of the devices 33. This is achieved by coupling write signals into one or more of the input lines 31 of the crowbar array structure 30. The write signals are generated based on write vectors that are generated (S22) by the interface 20. The write vectors are themselves generated according to write instructions (S21) from the controller 10.

When needed, the electronic devices 33 can retrieve data S24-S26 from the neuromorphic memory device 30 according to a multiply-accumulate operation. This is achieved by coupling read signals into one or more of the input lines 31 of the neuromorphic memory device 30, based on read vectors generated S25 by the interface 20. The read vectors are themselves generated according to read instructions S24 from the controller 10.

The processing unit of the controller 10 is configured to implement and execute a neural network. Note, the processing unit may, for instance, be a general-purpose processing unit (e.g., a central processing unit of a standard computer), or comprise analog circuits. The processing unit may notably include another neuromorphic device (not shown). However, in the depicted embodiment, the neuromorphic memory device 30 does not form part of the processing unit. Rather, the neuromorphic device 30 is configured to serve as an external memory for the controller 10 and the processing unit of the controller 10. Thus, the neuromorphic device 30 used as external memory and should not be confused with other neuromorphic devices that may possibly form part of the controller 10 (or the write and read heads).

The neural network system 1 can thus be regarded as a memory-augmented system, in which the external memory 30 is embodied as a crossbar array structure. The latter is preferably a memristive crossbar structure, which may possibly use low precision (i.e., a single memristive element may be used to represent a memory element).

More generally, however, each electronic device 33 of the neuromorphic device 30 may possibly include one or more memristive devices. Also, dual output lines (columns) may be involved, one to store positive values, and another to store negative values, as usual in the art. Several types of memristive devices may be contemplated, such as PCM cells, resistive random-access memory (RRAM), static random-access memory (SRAM) cells, or electro-chemical random-access memory (ECRAM) cells. In other variants, flash cells may be used.

The interface 20 typically include multiple read/write heads (24/22) connecting the controller 10 to the memory 30. Such heads may be implemented in different ways. They may notably be implemented as a shallow neural network, as discussed later in reference to another aspect of the invention.

According to the present approach, the write process is simplified to an incremental write process, such that there is no need to read contents of the external memory 30 prior to writing (at least for the purpose of programming the cells). Only full memory resets of the electronic devices may be required, as in embodiments discussed below, while an incremental writing is otherwise implemented. That is, programming the electronic devices 33 results in incrementally change states of the devices 33 (e.g., change the electrical conductances of the devices 33). The states of the electronic devices 33 correspond to certain values, which determine data as stored on the neuromorphic device 30.

Note, incremental write processes as contemplated herein may notably involve incremental programming processes, whereby conductance states of the electronic devices are incremented in small, constant steps. In variants, the incremental write processes rely on iterative programming, whereby electronic devices are programmed using multiple pulses in an iterative manner. In other variants, incremental values are accumulatively stored in an additional memory 23, prior to writing such values, as in embodiments discussed later.

Reading from memory is achieved via vector-matrix multiplication, which can be performed in constant time, meaning that data may possibly be retrieved during any operation cycle. In practice, however, read operations will only be performed at specific times (according to the general algorithm run at the controller) and not necessarily at each operation cycle. In all cases, data can be retrieved via a multiply-accumulate operation, which is parameterized by values corresponding to the states of the electronic devices 33. This way, data can be stored on the external memory formed by the neuromorphic device and such data can be recalled by the controller 10, as needed to perform S20 tasks supervised by the controller 10.

Read/write memory accesses are determined by respective read/write vectors, based on inputs from the controller 10. Such vectors can be compared to memory addresses. However, while memory addresses correspond to specific locations in a usual hardware memory, here the read/write vectors determine signals needed and where to apply such signals to write to or read from the memory 30, according to a given operation, e.g., a multiply-accumulate for read operations. Note, physical addresses of the electronic devices 33 are needed in the present cases too as the read/write operations require having access to each electronic device 33, individually. Inputs to the crossbar array structure 30 can for instance be achieved using digital-to-analog converters (DACs), pulse width modulation (PWM) circuits 35 or, alternatively, a time-to-spike approach, as discussed later in detail.

The present approach brings several advantages. First, a memory-augmented neural network system 1, such as that disclosed herein, can efficiently utilize crossbar structures, where the in-memory computation capabilities allow read and write operations from memory to be performed in constant time. Second, the proposed approach is not limited to memristive technologies; other technologies like flash cells can be contemplated. Third, the proposed write access removes the need to read the external memory prior to a writing cycle (no partial reset of the memory cells is needed). This enables full compatibility with known crossbar structures based on memristive devices, e.g., PCM devices. Thus, the proposed solution allows memory accesses to be significantly sped up while reducing energy consumption in memory-augmented neural networks.

Notwithstanding the incremental write approach, the differentiability of the system can be restored, if necessary, by utilizing pseudo-derivatives, as in embodiments discussed below. And as noted earlier, the memory contents can be represented with low precision (e.g., 4 bits are sufficient). This approach allows an area-efficient implementation of the memory, as a single electronic device per junction suffices. However, the precision of the memory may be improved by using multiple memristive elements per junction, if necessary.

Figure 4:
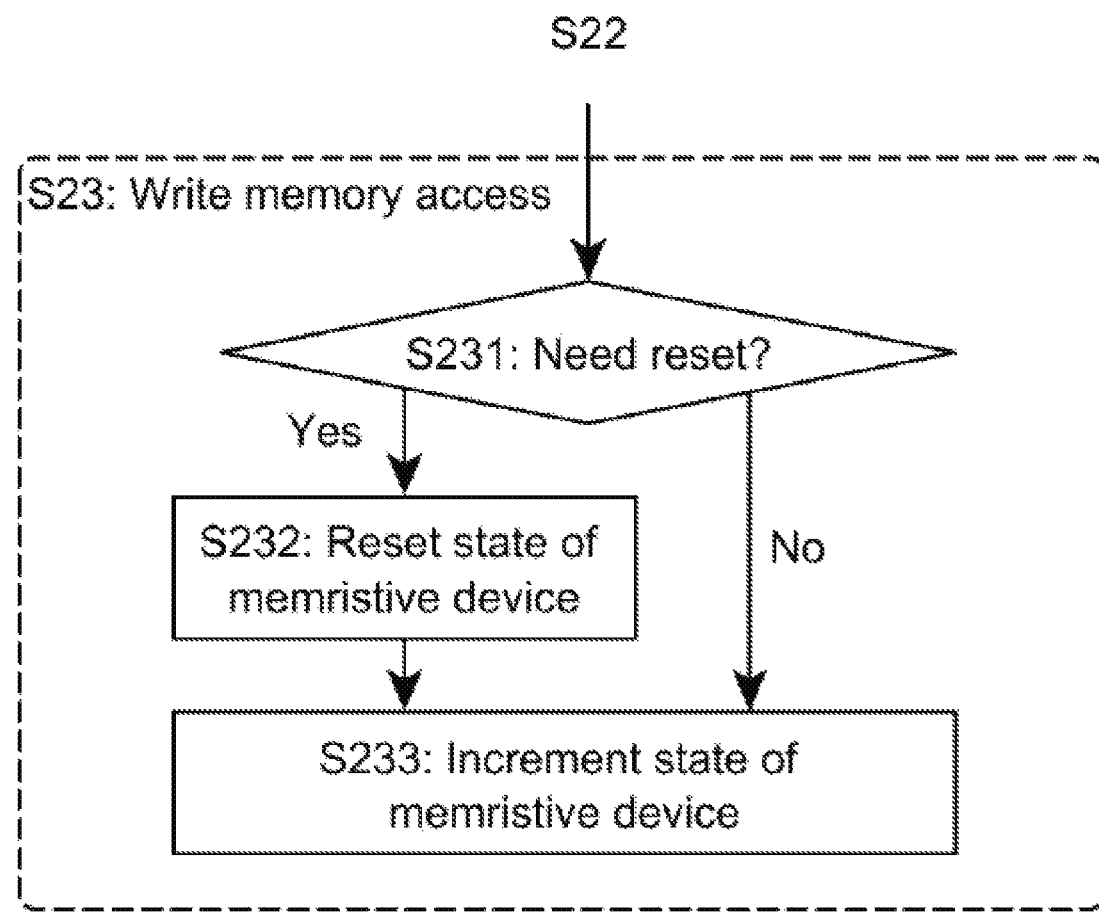
FIG. 4 is a flowchart illustrating sub-steps of a write memory access, in accordance with an embodiment of the present invention.
Figure 5:
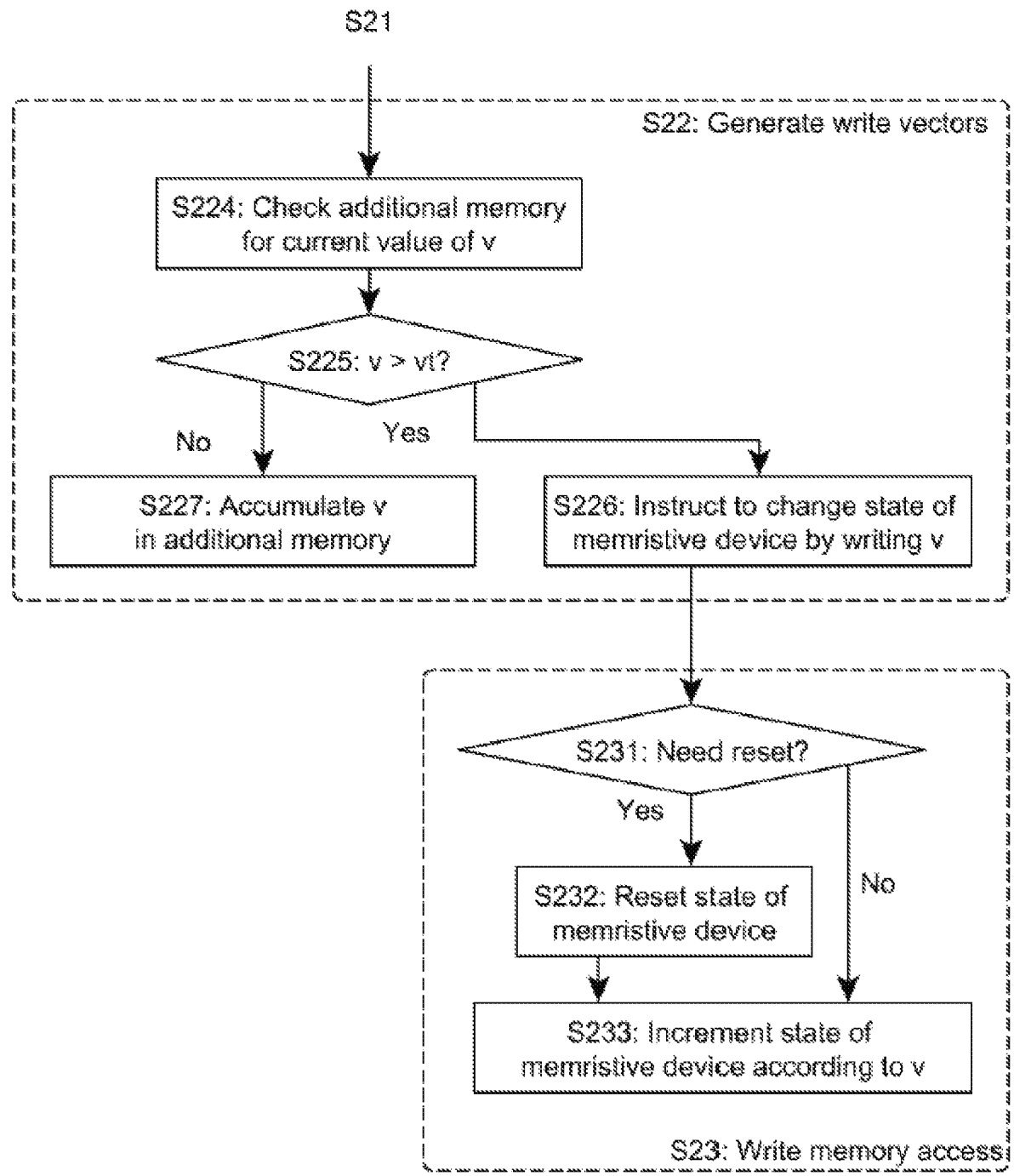
FIG. 5 is a flowchart illustrating how an electronic device of the neuromorphic memory device is programmed to incrementally change states of this electronic device, wherein incremental values are first accumulated in an additional memory, prior to writing the accumulated value to an electronic device, in accordance with an embodiment of the present invention.

All this is now described in detail, in reference to particular embodiments of the invention. Referring now to FIGS. 3-4, the programming S21-S23 of the electronic devices 33 may further comprise performing (S23) an erase operation (e.g., a reset), prior to incrementally changing the states of one or more of the electronic devices 33. The erase operation is determined by the write vectors. Such an erase operation can, in embodiments of the present invention, only consist of fully erasing an electronic device 33, so as to reset a state of the electronic device 33. Several electronic devices 33 may need to undergo such an erase operation depending on data to be written to the memory 30, as determined by the write vectors. In operation, other electronic devices 33 (typically the majority of such devices) may simply be incremented, at each writing cycle, without it being required to reset the respective electronic devices 33. In other words, a binary type of erase operations is contemplated, which can either be a full erase or a no erase of values stored on the electronic devices 33. Values stored on the electronic devices correspond to states of these devices. For erasing a cell, a reset pulse is applied, e.g., an amorphization pulse for a PCM cell. One may, for example, need to reset an electronic device 33 to zero when one needs to subtract a value. Next, an additive term is written to the cell, which term is computed as the final value, i.e., corresponding to the difference between the initial value and the subtrahend.

In fact, the present approach may be designed and performed so as to prevent any partial erasing of any of the electronic devices 33, at least for the purpose of programming S21-S23 the electronic devices 33 (i.e., for writing thereto). That is, the approach may be designed so as to guarantee that no memory read access is needed for the purpose of writing to the cells. Note, however, that the overall algorithm run by the controller 10 may require to read data from the memory, prior to writing data to the memory, as per vagaries of this algorithm. However, it remains that the basic memory writing process may be designed so as not to require reading memory contents prior to writing to the cells (to update the memory contents). In particular, the write vectors can be generated S22 by the interface 20 without any memory read access being required, i.e., without having to first retrieve data from the neuromorphic memory device 30. That is, step S22 can be, per se, independent from steps S24-S26.

As seen in FIGS. 1-2, the crossbar array structure 30 of the neural network system 1 may for example comprise N input lines 31 and W output lines 32, where $N>1$ and $W>1$. In that case, the memory capacity of the neuromorphic memory device 30 is determined by a memory matrix M of dimension $N \times W$. Note that, in variants, the present approach may also be applied to a single input line, and/or a single output line. In addition, dual output lines may be needed, as noted earlier.

In embodiments, the write signals are generated according to two operations, which are based on two types of write vectors. The first operation determines the extent of the erase operation (i.e., whether to fully reset or not reset at all), while the second operation is performed to incrementally change states of the electronic devices 33, as assumed in FIG. 4. That is, if a write vector of the first type implies that a reset is needed S231 for a given device 33, then this device is reset S232, prior to incrementally change S233 its state, according to the write vector of the second type. Else, if no reset is needed, then the state of this device 33 is directly incremented S233. In other words, the write access is separated into an erase part and an additive part.

For example, the first operation may involve the memory matrix multiplied by a binary value vector, where the binary value vector determines the extent of the binary erase operation (i.e., either no erase or a full erase), while the second operation involves an additive term to incrementally change states of the electronic devices 33. That is, two types of vectors are used, i.e., call them vectors $e^T$ and $v^T$, which enable two operations (a sum of operations).

In addition, the programming may further involve binarizing values of components of the vector $e^T$. This can be written: $M[i,j]=M[i,j](1-Ee'^T[j])+Ev^T[j]$, where $E \in ^{N \times 1}$ and $e'[j] \in (0,1)^{W \times 1}$. Note, e' denotes a binarized vector. The binary vector component e'[j] can be obtained by binarizing the usual vector component e[j]. The terms $Ee'^T$ and $Ev^T$ can be regarded as modified write keys, which can be generated in different ways, depending on the architecture at hand (e.g., Differentiable Neural Computer [DNC], Neural Turing Machine [NTM], etc.).

In embodiments, the binarization is achieved by computing the values of components of the vector $e^T$ as a Heaviside function of shifted values of the vector components. One may for example use $e'[j]=\Theta(e[j]-0.5)$. In variants, one may use two Heaviside functions, or even comparator circuits, to achieve similar results, as the skilled person may appreciate.

Note, a direct implementation of the present approach may come at the cost of losing differentiability, which may impair the training (e.g., for applications to supervised learning based on the backpropagation algorithm). Still, pseudo derivatives can be relied on, to restore the differentiability and thus the error backpropagation algorithm. For example, one may consider using an analytic approximation to the Heaviside function, e.g., $\Theta(x) \approx (1+\tanh(kx))/2$, with a sufficiently large value of k, yielding the derivative $$\frac{\partial \Theta}{\partial x} \approx \frac{k}{2}(1-\tanh(kx)^2).$$

In variants, one may use $$\Theta(x) \approx \frac{1}{2} + \frac{1}{\pi}\arctan(kx),$$

for example.

Thus, a simplified write approach can be involved, where either no erase or a full erase is performed, prior to increment states of the devices 33. Meanwhile, the memory content does not need to be read prior to writing. In addition, a thresholding approach can be used to restore the differentiability (using pseudo derivatives).

As said, the general algorithm run by the controller 10 may nevertheless need to read content from the device 30 (other than to write content thereto). As illustrated in FIG. 3, controller 10 retrieves data (S24) from the neuromorphic memory device 30 according to a multiply-accumulate operation. For example, the interface 20 generates a read vector $w^r$ (S25) and multiplies the read vector $w^r$ by the memory matrix M Again, the vectors $w^r$ are read keys that can be generated in different ways, depending on the architecture at hand. Each read result r is obtained through a multiplication of the vector $w^r$ by the memory matrix M. This operation can be written as $r[j]=\Sigma_{i=1}^{N}[i,j]^T w^r[i]$. In other words, read access to the memory can be formulated as a vector-matrix multiplication, where the memory M is represented by a crossbar array of dimension N×W. The vector $w^r$ can notably be represented to the crossbar structure 30 using digital-to-analog converters (DACs), or a simple PWM circuitry 35. In further variants, a time-to-spike (TTS) implementation can be relied on, as discussed later.

As noted earlier, the incremental write approach is not incompatible with accumulative programming. For instance, referring to FIG. 5, the additive terms involved in the second operation may be performed by accumulating (S227) additive values v for said additive terms, in an additional memory 23 distinct from the external memory 30 (see FIG. 1). Again, such additive values are determined by the second types of write vectors. In operation, after checking (S224) a current value v of a given additive value: if the accumulated additive values v happens to exceed (S225) a given threshold $v_T$, then the algorithm instructs (S226) to incrementally change a state of a given electronic device 33 according to this accumulated additive value v. Thus, for small values of v, there is the possibility to accumulate v locally (in the additional memory 23) and apply v only in subsequent steps. The accumulation process can be performed as part of the write vector generation (S22), as assumed in FIG. 5. Then, the algorithm goes on as explained earlier in reference to FIG. 4.

Note, in variants, updates may also be applied with some granularity during the write process. Such updates may be useful for hardware architectures that only support updates of a fixed size, for example PCM devices. As a result, a certain value $\tilde{v}$ may happen to be applied, which slightly differs from the ideal value v. In such cases, the difference $v-\tilde{v}$ may also need be stored in the additional memory 23. Such variants could benefit to certain types of hardware, such as PCM-based implementations, or any other hardware that only allow applying pulses with a certain fixed power, which corresponds to a fixed-value increment.

In typical applications, the processing unit of the controller 10 runs S20 an algorithm that causes the system 1 to interleave steps of programming S21-S23 the electronic devices 33 and retrieving S24-S26 data from the neuromorphic memory device 30. This algorithm may notably be run to train a neural network. This, in operation, causes the processing unit to execute the neural network multiple times. For example, inputs as stored on the neuromorphic memory device 30 may be fed into input nodes of the neural network, prior to executing said neural network. Executing the neural network leads to outputs that are stored on the neuromorphic memory device 30, and so on.

Referring back FIGS. 1-2, another aspect of the invention is now described, which concerns the neural network system 1 per se. As discussed earlier, the system 1 comprises a controller 10, which itself includes a processing unit. The processing unit is configured to execute a neural network. The system 1 further includes a memory 30 (i.e., an external memory) that comprises the neuromorphic memory device.

As said, the neuromorphic memory device of memory 30 has a crossbar array structure that includes input lines 31 and output lines 32. The lines are interconnected at junctions via electronic devices 33. The system 1 further comprises an interface 20, which connects the controller 10 to the memory 30.

The system 1 is generally configured to program the electronic devices 33 to incrementally change states thereof. As explained in reference to the present methods, this is achieved by coupling write signals into one or more of the input lines 31. Such signals are generated based on write instructions from the controller 10 and write vectors generated by the interface 20 according to such write instructions, in operation. In addition, data is retrieved from the neuromorphic memory device 30 according to a multiply-accumulate operation, by coupling read signals into one or more of the input lines 31 of the neuromorphic memory device 30. The read signals are generated based on read instructions from the controller 10 and read vectors generated by the interface 20 according to such read instructions.

In embodiments, the system 1 is further configured to perform erase operations, prior to incrementally changing the states of the electronic devices 33. As already explained, said erase operations are determined by the write vectors, whereby each erase operation can only consist of: (i) fully erasing one of the electronic devices 33 or (ii) not erasing at all this electronic device 33. Fully erasing an electronic device causes to reset a state thereof, in operation. Even more so, the neural network system 1 may be configured so as to prevent any partial erasing of any of the electronic devices 33 (at least for the purpose of programming, i.e., writing to such electronic devices 33), in operation of the system.

As seen in FIGS. 1-2, the crossbar array structure typically comprises N input lines 31 and W output lines 32, where N>1 and W>1, whereby a memory capacity of the neuromorphic memory device 30 is determined by a memory matrix M of dimension N×W. The crossbar array structure preferably comprises a single electronic device per junction, where each of the electronic devices may for instance be a memristive device, i.e., a memristive memory element. The content of the memory can indeed be represented with limited precision (e.g., 4 bits), which allows advantages of a memristive crossbar implementation to be fully exploited.

As noted earlier, the interface 20 may include read heads 24, which are connected to both the input lines 31 and the output lines 32, as well as write heads 22 connected to the input lines 31. Various structures of read heads 24 and write heads 22 can be contemplated, as discussed earlier.

In embodiments, the crossbar array structure further comprises PWM circuits 35, as depicted in FIG. 2B. The PWM circuits are used to controllably generate the signals needed to write to and read from the memory device 30. Both the read heads 24 and the write heads 22 are connected to the input lines 31 via a respective PWM circuit 35. In variants, a time-to-spike (TTS) approach can be used. That is, a low-latency TTS integrator may be used, which make use of the timing of the signals to more efficiently transmit the information.

The read heads 24 are otherwise connected to output of the crossbar structure to read result from the multiply-accumulate operations and return such results to the controller 10. Standard readout circuits 36 can be used to read output currents from the output lines 32.

Interestingly, the read heads 24 can possibly be embodied as a module implementing a shallow neural network, e.g., a two-layer network. That is, this network may include an input layer, whose input nodes are mapped onto outputs from the controller 10, and an output layer, whose output nodes are mapped onto input lines 31 of the crossbar array structure. Similarly, the write heads 22 may be embodied as a module implementing two shallow neural networks. Each of said network comprises an input layer, the input nodes of which are mapped onto outputs from the controller 10, and an output layer, the output nodes of which are mapped onto input lines 31 of the crossbar array structure 30. This makes it possible to output two types of write vectors, based on which the system 1 can perform the two operations described earlier. That is, the first type of operations determines erase operations, while the second type of operations aims at incrementally changing states of the electronic devices 33. Note, the read/write heads (24/22) may also be embodied as neuromorphic devices, each having a crossbar array structure. Such neuromorphic devices can adequately be used to implement shallow networks as needed to generate the read and write signals.

The above embodiments have been succinctly described in reference to the accompanying drawings and may accommodate a number of variants. Several combinations of the above features may be contemplated. For example, in embodiments, a memristive crossbar structure 30 (with PCM cells) is used together with optimized read/write heads (24/22) to achieve an external memory for the controller 10 and its processing unit. The controller is aimed at executing a neural network, be it to train the latter or perform inferences based on the trained network. Such a neural network can thus be augmented with memory built on memristive devices 33. The memory contents can be represented with low precision or even with binary values stored in the memristive devices. A simplified write approach is relied on, to perform memory write accesses without reading current contents of the memory array 30 and without partial resets of the memristive devices 33.

The present approach can for example be applied to the so-called copy-repeat task (adopted from A. Graves and G. Wayne, et. al., Nature 2016, cited in the background section). The architecture adopted can for example be the following. A recurrent controller network 10 can be used (which includes 10 LSTM units, instead of 64 LSTM units), together with an external memory device of memory size 16×16, as well as four read heads 24 and one write head 22. The network structure and the operation of the read and write heads 22 can otherwise be similar to those in the above paper. As the present inventors observed, the simplified memory access described earlier does not affect the performance of the network, while the limited precision used to represent the content of the memory does not give rise to any accuracy loss.

As another example of application, similarity measures can be computed using a simple PWM circuitry 35. The generation of read/write weights may require dot products and norms to be computed, i.e., to measure distances according to:

$$d = \frac{kM}{\|k\|_1 + \|M\|_1}$$

k represents the input vector and M represents the memory. Such computations can potentially be performed using a single generation of PWM input signals. A fixed part, representing 1, is added to the PWM signal corresponding to the value of k to compute the norm $\|M\|_1$. Two read accesses from the device 30 are needed, where the first access corresponds to the norm $\|M\|_1$ and the second access corresponds to a vector-matrix multiplication kM. One way to obtain the two results separately is to reset the integrators after $\|M\|_1$ has been computed. In variants the integrators operate continuously and after the fixed part has been processed at the input, the current value is stored in an auxiliary memory. After the full input has been processed, the previously stored value needs to be subtracted from the total result to obtain $\|M\|_1$ and kM.

Note, a time-to-spike scheme can be used for the input vector presentation at the rows/columns of the crossbar array 30, instead of using DACs or a PWM circuitry, which allows the energy required to transmit the input to be reduced. Also in this case, the procedure to compute the similarity measure can potentially be implemented in a single crossbar operation. The pulses transmitted as reference points in the TTS scheme can be utilized for the L1 Norm Parallel Read (input vector contains all ones). The dot product parallel read can be implemented using the second pulse and the TTS integrator scheme. Instead of having a reference signal that activates the modulatory terms of the TTS integrators to their initial values, the currents are read during the reference signals to obtain the $\|M\|_1$. As a consequence, a single TTS read returns both the norm of M and the value of kM.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

Figure 6:
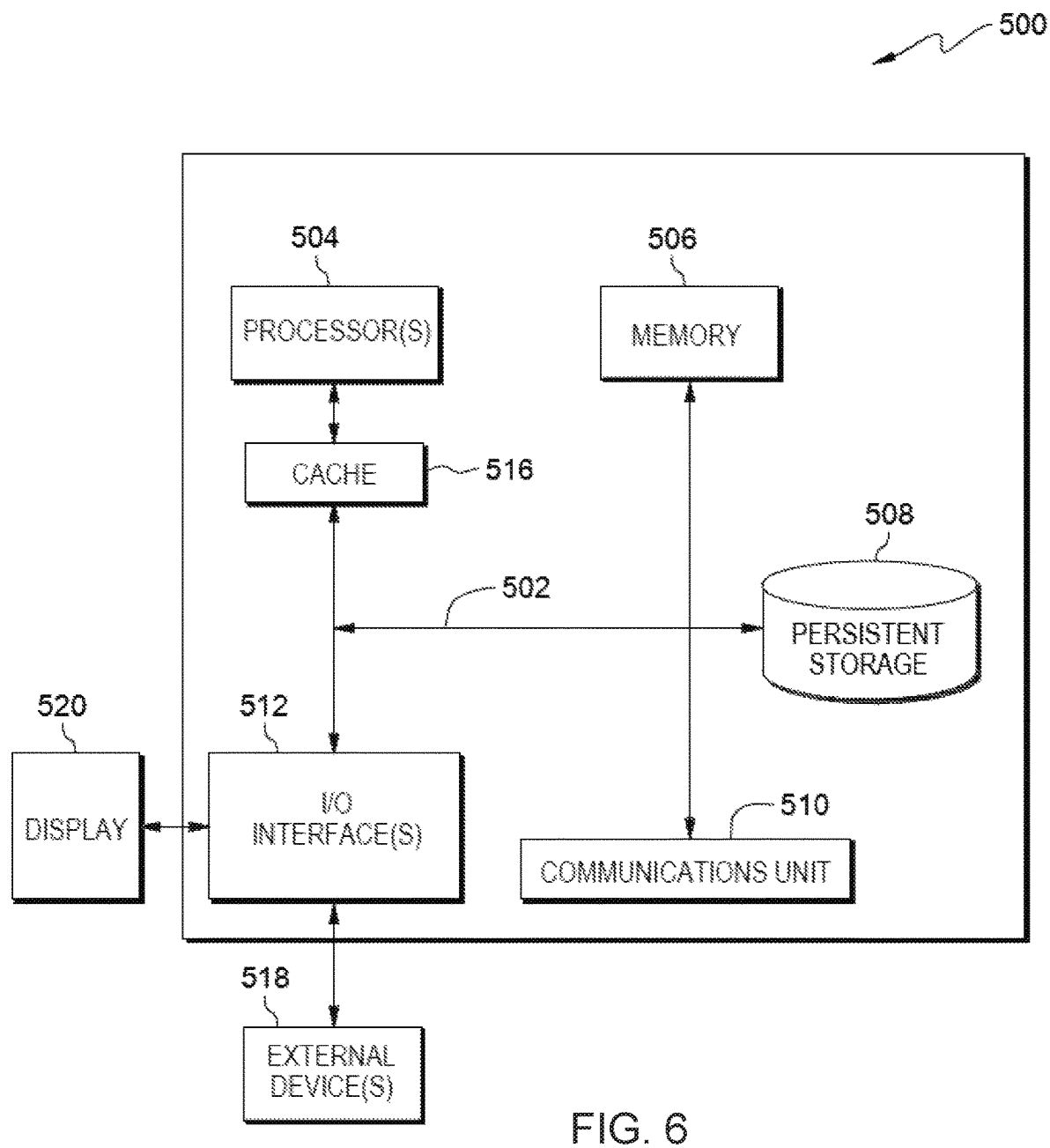
FIG. 6 is a block diagram of components of a computer system that may be included as part of a neural network system in accordance with an embodiment of the present invention.

FIG. 6 depicts a block diagram of components of computer system 500 that may be included as a part of neural network system 1, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to computer system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A hardware-implemented method for operating a neural network system, the method comprising:
   providing a neural network system comprising a controller, a memory, and an interface connecting the controller to the memory, wherein:
      the controller comprises a processing unit configured to execute a neural network;
      the memory comprises a neuromorphic memory device with a crossbar array structure that includes input lines and output lines interconnected at junctions via memristive devices; and
      the memristive devices comprise a single phase-change memory (PCM) cell per junction;
   programming the memristive devices of the neuromorphic memory device to incrementally change states thereof by coupling write signals into one or more of the input lines based on: (i) write instructions received from the controller and (ii) write vectors generated by the interface, according to the write instructions; and
   retrieving data from the neuromorphic memory device, according to a multiply-accumulate operation, by coupling read signals into one or more of the input lines of the neuromorphic memory device based on: (i) read instructions from the controller and (ii) read vectors generated by the interface, according to the read instructions.

2. The method according to claim 1, wherein:
   programming the memristive devices further comprises performing an erase operation prior to incrementally changing the states of one or more of the memristive devices, and
   the erase operation is determined by the write vectors, whereby the erase operation fully erases the one or more of the memristive devices, so as to reset respective states thereof.

3. The method according to claim 1, wherein:
   the write vectors are generated by the interface without the interface retrieving any data from the neuromorphic memory device.

4. The method according to claim 2, wherein:
   the crossbar array structure of the neural network system provided comprises N of the input lines and W of the output lines, where N>1 and W>1; and
   a memory capacity of the neuromorphic memory device is determined by a memory matrix M of dimension N×W.

5. The method according to claim 4, wherein:
   the write signals are generated according to two operations based on two types of write vectors, the two operations including a first operation to determine the erase operation and a second operation to incrementally change states of the memristive devices.

6. The method according to claim 5, wherein:
   the second operation involves additive terms and is performed by:
      accumulating additive values for the additive terms, the additive values determined by a second type of the two types of write vectors; and;
      responsive to the accumulated additive values exceeding a given threshold, incrementally changing states of the memristive devices according to such accumulated additive values.

7. The method according to claim 5, wherein:
   programming the memristive devices further comprises binarizing values of components of a vector of one of the two types of vectors.

8. The method according to claim 7, wherein:
   binarizing the values comprises computing the values as a Heaviside function of shifted values of the vector components.

9. The method according to claim 4, wherein:
   a second set of data is retrieved from the neuromorphic memory device according to the multiply-accumulate operation, whereby a read vector generated by the interface is multiplied by the memory matrix M.

10. The method according to claim 1, further comprising:
    running an algorithm by the processing unit of the controller, the algorithm causing the system to interleave steps of: (i) programming the memristive devices and (ii) retrieving data from the neuromorphic memory device.

11. A neural network system comprising:
    a controller including a processing unit configured to execute a neural network,
    a memory comprising a neuromorphic memory device with a crossbar array structure that includes input lines and output lines interconnected at junctions via memristive devices, the memristive devices comprising a single phase-change memory (PCM) cell per junction, and
    an interface connecting the controller to the memory, wherein the system is configured to:
    program the memristive devices of the neuromorphic memory device to incrementally change states thereof by coupling write signals into one or more of the input lines based on: (i) write instructions received from the controller and (ii) write vectors generated by the interface, according to the write instructions; and
    retrieve data from the neuromorphic memory device, according to a multiply-accumulate operation, by coupling read signals into one or more of the input lines of the neuromorphic memory device based on: (i) read instructions from the controller and (ii) read vectors generated by the interface, according to the read instructions.

12. The neural network system according to claim 11, wherein:
    the system is further configured to perform erase operations, prior to incrementally changing the states of the memristive devices, and
    the erase operations are determined by the write vectors, whereby each of such erase operations can only perform an action selected from the group consisting of: (i) fully erasing one of the memristive devices and (ii) not erasing at all of the one of the memristive devices, in operation.

13. The neural network system according to claim 12, wherein:
    the crossbar array structure comprises N of the input lines and W of the output lines, where N>1 and W>1; and
    a memory capacity of the neuromorphic memory device is determined by a memory matrix M of dimension N×W.

14. The neural network system according to claim 13, wherein:
    the interface comprises read heads connected to the input lines and the output lines, and write heads connected to the input lines.

15. The neural network system according to claim 14, wherein:
    the crossbar array structure further comprises pulse width modulation circuits, whereby both the read heads and the write heads are connected to the input lines via a respective one of the pulse width modulation circuits.

16. The neural network system according to claim 14, wherein:
the read heads are embodied as a module implementing a two-layer neural network, the two-layer neural network including:
an input layer, whose input nodes are mapped onto outputs from the controller; and
an output layer, whose output nodes are mapped onto input lines of the crossbar array structure.

17. The neural network system according to claim 15, wherein
the write heads are embodied as a module implementing two neural networks, each neural network comprising:
an input layer, input nodes of which are mapped onto outputs from the controller; and
an output layer, output nodes of which are mapped onto input lines of the crossbar array structure, for respectively outputting two types of write vectors, based on which the system is adapted to perform two operations, including a first operation determining the erase operation and a second operation to incrementally change states of the memristive devices.

18. The method of claim 1, wherein programming the memristive devices of the neuromorphic memory device, to incrementally change states thereof by coupling write signals into one or more of the input lines, is performed without reaching contexts of the memory prior to writing.

* * * * *